United States Patent
Tsai et al.

(10) Patent No.: US 11,659,588 B1
(45) Date of Patent: May 23, 2023

(54) MULTI-TIER COORDINATED CHANNEL PRIORITIZATION SYSTEM

(71) Applicant: Amazon Technologies, Inc., Seattle, WA (US)

(72) Inventors: Kun Ting Tsai, Fremont, CA (US); Nathan Labadie, Gilroy, CA (US); Cheol Su Kim, San Jose, CA (US); King Shaw, Saratoga, CA (US); Sarang Wagholikar, Sunnyvale, CA (US); Omar Fawazhashim Zakaria, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 122 days.

(21) Appl. No.: 17/160,104

(22) Filed: Jan. 27, 2021

(51) Int. Cl.
*H04W 72/56* (2023.01)
*H04W 72/0453* (2023.01)

(52) U.S. Cl.
CPC ....... *H04W 72/56* (2023.01); *H04W 72/0453* (2013.01)

(58) Field of Classification Search
None
See application file for complete search history.

(56) References Cited

U.S. PATENT DOCUMENTS 10,397,928 B1 * 8/2019 Hahn .................... H04W 16/20
10,834,640 B1 * 11/2020 Sitaram ............. H04W 72/0486
2015/0305050 A1 * 10/2015 Xia ...................... H04W 72/082
  370/329
2016/0037542 A1 * 2/2016 Tang ...................... H04W 72/10
  370/329
2021/0377915 A1 * 12/2021 Lalam ............... H04W 72/0453

FOREIGN PATENT DOCUMENTS

| EP | 1760966 A2 * | 3/2007 | ............. H04L 47/10 |
| JP | 6469722 B2 * | 2/2019 | ............ H04J 3/1694 |
| WO | WO-2016000758 A1 * | 1/2016 | ............ H04W 16/10 |

* cited by examiner

Primary Examiner — Ajit Patel
(74) Attorney, Agent, or Firm — Lowenstein Sandler LLP

(57) ABSTRACT

Technologies directed to prioritized channel coordination in a multi-tier wireless network are described. One method includes identifying a first group of wireless devices located in a first geographical area using physical proximity information. The method includes, for a first wireless device having a highest priority among the wireless device in the first geographical area, determining a penalty value for each channel of a plurality of available channels and selecting a first channel having a lowest penalty value. The method includes, for a second wireless device having a second-highest priority, determining a penalty value for each of the remaining channels in the plurality of available channels and selecting a second channel, from the remaining channels, having a lowest penalty value. The method includes sending to the first wireless device information about the first channel and sending to the second wireless device information about the second channel.

18 Claims, 7 Drawing Sheets

MULTI-TIER COORDINATED CHANNEL PRIORITIZATION SYSTEM

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. To wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
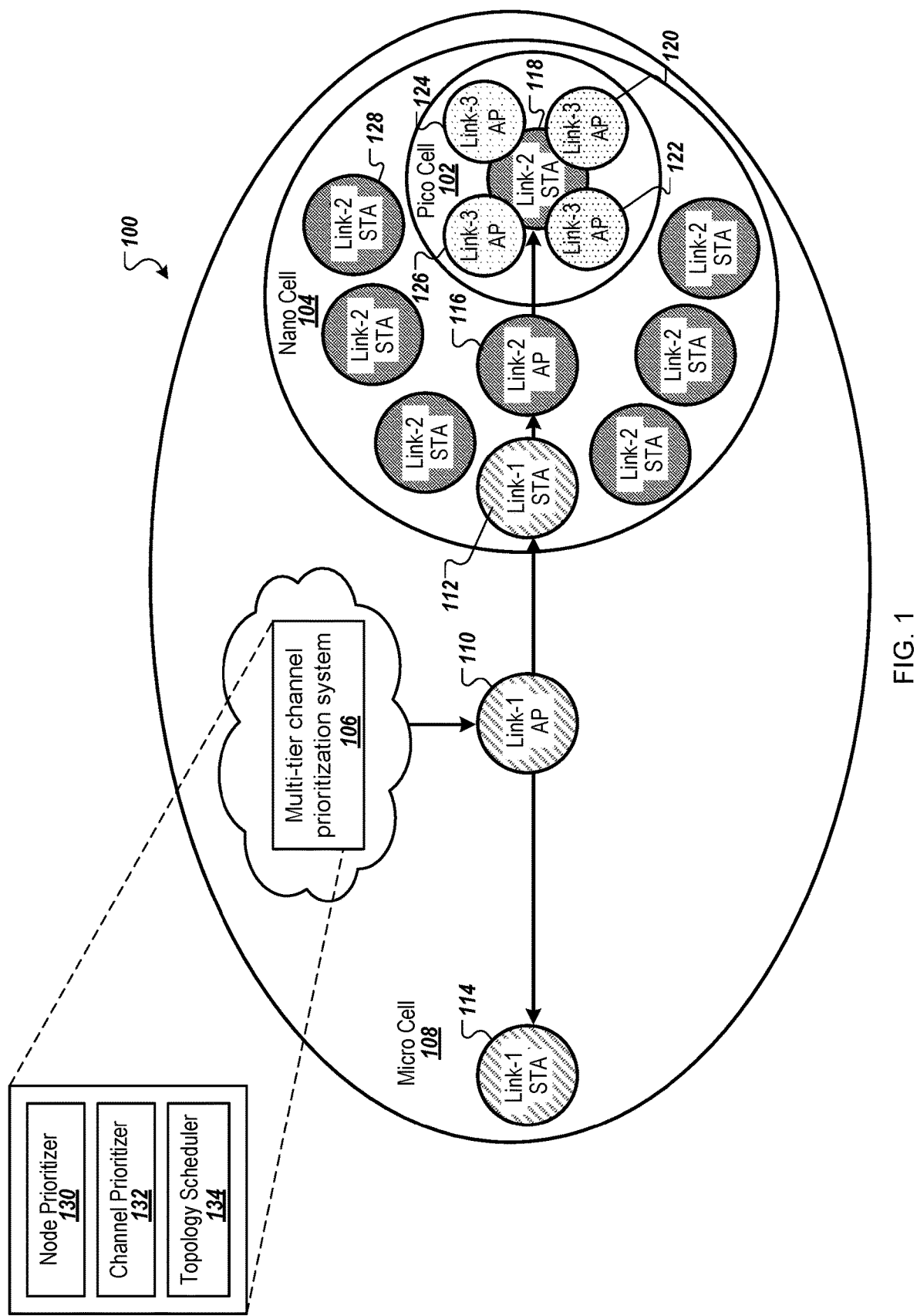
FIG. 1 is a network diagram of a multi-tier channel prioritization system that assigns channels to network hardware devices organized in a wireless network for providing services to client devices in an environment according to one embodiment.

Technologies directed to prioritized channel coordination in a multi-tier wireless network are described. The 2.4 GHz and 5 GHz industrial, scientific, and medical (ISM) radio bands allow unlicensed wireless communications. Due to its unlicensed nature, many short-ranged, low power wireless communication systems operate in these frequency bands. As such, there is a limited de-license spectrum in various locations (e.g., 2.4 GHz ISM and 5 GHz U-NII bands). Various devices are described herein that include wireless local area network (WLAN) radios operate in the 2.4 GHz and 5 GHz U-NII-1 bands and utilize various WLAN protocols, such as the Wi-Fi® protocols (e.g., 802.11n, 802.11ac, or the like). The radios can utilize 2×2 spatial multiplexing MIMO and channel bandwidths from 20 MHz to 40 MHz. The radios can see all 5.x GHz channels, including Dynamic Frequency Selection (DFS) channels, and can operate at an Equivalent Isotropically Radiated Power (EIRP) up to 36 dBmi, depending on the channel. The devices described herein can be deployed in a wireless network having a hierarchical topology between an Internet Service Provider (ISP) ingress to a subscriber. In various embodiments, the wireless network is logically organized as a cascaded star topology as described in more detail below.

The network architecture described herein is capable of providing Video on Demand (VoD) and Internet services to customers at scale. The network architecture described herein can be deployed in areas with limited, traditional ISP infrastructure, for example. These services can be enabled by a combination of wired ingress, wireless connectivity, and tiered content caching in the network architecture described herein. At a high level, the network architecture of the wireless networks described herein are logically organized into hierarchical units, referred to herein as cell units, nodes, and devices, such as described and illustrated with respect to FIG. 1.

The embodiments described herein relate to a network architecture to deliver both videos on demand (VoD) and internet to customers in locations with limited internet infrastructure. The network architecture includes technology for the distribution of VoD and Internet services to customers using wired and wireless links. The network devices are organized into three logical units known as nodes: base station nodes (BSNs), relay nodes (RLNs), and customer premises equipment (CPE) nodes (also referred to as Home access nodes (HANs)). Each node supports a unique set of network functions. The CPE node provides connectivity for in-home customer devices (FireTV, laptop) to the outdoor wireless access network. RLN aggregates the wireless access traffic from the CPEs and passes this data back to a central BSN over a wireless distribution network. The BSN aggregates both the RLN wireless distribution and local wireless access traffic to a fiber ingress point. The devices at the nodes can be manufactured as a common device type and programmed according to any of the following device roles: a router (RT) role, a base station (BS) role, a gateway (GW) role, a relay (RL) role, or a customer station (STA) role. That is, the devices can each include identical hardware and can each be programmed to operate as one of an RT, a BS, a GW, an RL, a customer STA, a NAS, or the like.

A conventional channel assignment system uses an automatic channel selection method where each Access Point (AP) scans its surrounding environment and selects as its operating channel a least-utilized channel at the time of the scan. This automatic channel selection method has many flaws where the environment that the Access Point captures during the scan may not represent an actual medium usage over time. This automatic channel selection method also heavily depends on whether neighboring APs are powered up at the time of the scan. These limitations make the automatic channel selection unsuitable for some deployments, including large infrastructure deployments. Other channel assignment methods have tried to address the shortfalls of the automatic channel selection method by utilizing node and basic service set (BSS) coloring techniques, which assign different channels to adjacent neighboring APs, to reduce interferences between neighboring APs. However, node and BSS coloring techniques assume that all nodes in the network are of the same type and priority. Thus, the node and BSS coloring techniques are unable to guarantee the optimal quality of service (QoS) to nodes that are of higher priority, such as nodes that are serving more clients than others.

Aspects of the present disclosure address the above and other deficiencies by slicing nodes into different priority tiers, prioritizing nodes within the same tier according to their downstream children, applying a channel cost function to prioritize the channel selection, and propagate information of the channel selection through the network. In one embodiment, a multi-tier channel prioritization system includes three main software components, including a node prioritizer, a channel prioritizer, and a topology scheduler, as described below with respect to FIG. 1.

FIG. 1 is a network diagram of a multi-tier channel prioritization system 106 that assigns channels to network hardware devices organized in a wireless network 100 for providing services to client devices in an environment according to one embodiment. Wireless network 100 can be logically organized into the following hierarchical units: cells, nodes, and devices according to one embodiment. A "cell unit" is a collection of wired connections and wireless connections arranged in a cellular structure. It should be noted that a cell unit is not a cell of a cellular wireless network. The cell unit is made up of smaller cell units, called pico-cell units (e.g., 102), nano-cell units (e.g., 104), and micro-cell units (e.g., 108). As described herein, a pico-cell unit 102 is a cell unit that includes customer premise equipment at customer premises (e.g., buildings, houses, or the like). The pico-cell unit 102 is served by gateway devices from a single base station node or a relay node. A nano-cell unit 104 is a cell unit that includes one or more pico-cell units 102. The nano-cell unit 104 is served by base station devices from a single base station node. A micro-cell unit 108 is a cell unit that includes one or more nano-cell units 104. The nano-cell units 104 of the micro-cell 108 are connected via a wireless network.

A "node" is a logical network building block that is sub-divided into "infrastructure" (e.g., base station nodes, relay nodes, or the like) and "customer premises equipment (CPE)." The wireless network 100 can include the following "nodes:" a base station node (BSN), a relay node (RLN), storage (NAS) node, and a CPE node (also referred to as a home access node (HAN). A BSN connects to an Internet Service Provider (ISP) ingress via a router device, provides a first coverage (e.g., BS coverage) to the RLN, and provides a second coverage (e.g., gateway coverage) to a first CPE node, such as CPE node. The RLN connects to the BSN through a relay device and provides a third coverage (e.g., gateway coverage) to a second CPE node. The CPE node can include one or more customer stations that provide one or more access points for one or more endpoint devices at the customer premises. The first coverage can be a first wireless service the second coverage can be a second wireless service, and the third coverage can be a third wireless service.

As illustrated in FIG. 1, the nodes (e.g., BSN, RLN, and CPE node) can be organized logically in a cascaded star topology. In the cascaded star topology, a first node 110 (Link-1 AP) can provide services to downstream nodes 112 (Link-1 STA) and 114 (Link-1 STA) as first-tier links. Downstream nodes 112, 114 can provide service to additional downstream nodes, such as downstream node 116 as second-tier links with respect to downstream nodes, such as downstream node 118. Downstream node 118 can provide service to downstream nodes, such as downstream nodes 120, 122, 124, 126, as third-tier links. The cascaded star topology is a configuration of a star network that can use hubs on spokes of the star network to expand or cascade the network into additional star networks. Alternatively, the nodes can be organized in other multi-star networks or other chained interface configurations.

The network architecture of the wireless network 100 is itself device-agnostic, although various embodiments described herein can utilize wireless network devices that are each manufactured as a common device type (e.g., single SKU product) and programmed to operate as a "device role." A "device role" is a set of specific network functions associated with one or more network devices, such as a primary wireless network device (also referred to herein as "wireless device," "network device," or "D2") that is configured according to a device role (e.g., a gateway device, a customer station, or the like). For example, a wireless device that is configured according to the gateway role operates as a gateway (GW). In various embodiments, the common device type can be programmed to operate according to one of the following device roles: a router (RT) role, a base station (BS) role, a relay (RL) role, a gateway (GW) role, a customer station (STA) role, or a storage (NAS) role. It should be noted that the nodes of the wireless network 100 are logically organized, whereas the devices of a particular node are physically organized at a location of a customer premise, such as a single dwelling unit (SDU), a multi-dwelling unit (MDU), or at other buildings or structures as described below.

The nodes can include a network switch and multiple wireless devices of the common device type. The multiple wireless devices of the nodes can be any one or more of a base station device, a gateway device, a relay device, a router device, and/or a storage device. For example, a base station device is a wireless network device that is programmed to operate as the BS role, a gateway device is a wireless network device that is programmed to operate according to the GW role, and a relay device is a wireless network device that is programmed to operate according to the RL role. The storage device is a wireless network device that includes one or more attached storage mediums, such as USB connected storage media (e.g., HDD, SSD, or the like), is programmed to operate according to the NAS role. That is, the storage device can be programmed to operate as a storage controller to the attached storage mediums. A CPE node, such as nodes 120, 122, 124, 126 can include one or more devices (referred to herein as customer premises equipment), including one or more customer stations and one or more endpoint devices. For example, a customer station can be the wireless network device that is manufactured and programmed to operate as the customer STA. The customer STA can provide an AP for one or more endpoint devices (not illustrated in FIG. 1). The one or more endpoint devices can be various types of wireless devices, such as mobile devices, smart TVs, TV dongles, watches, IoT devices, thermostats, home automation equipment, laptops, computers, entertainment consoles, gaming consoles, voice-controlled devices, or the like.

In one embodiment, the base station device (i.e., BS role) can use one or more radios to provide a first multi-sector, point-to-multi-point (PtMP) coverage to one or more relay devices up to a first distance, the first distance being approximately 100 meters, for example. The base station device can use one or more radios to provide the first wireless service to the relay node and any other relay nodes that are located within the first distance from the base station device The relay device can use one or more radios to provide a single sector, point-to-point (PtP) connectivity to the base station device up to a second distance, the second distance being approximately 100 meters, for example. The relay device can use one or more radios to connect with the base station device via the first wireless service and provide the third wireless service to the first CPE node and any other CPE nodes that are located within the second distance from the relay device. A first gateway device (at the BSN) can use one or more radios to provide a second multi-sector, PtMP coverage to one or more customer stations up to a third distance, the third distance being approximately 30 meters, for example. The first gateway device can use one or more radios to provide the second wireless service to the second CPE node and any other CPE nodes that are located within the third distance from the first gateway device. A second gateway device (at the RLN) can use one or more radios to provide a third multi-sector, PtMP coverage to one or more additional customer stations up to a fourth distance, the fourth distance being approximately 30 meters, for example. The second gateway device can use one or more radios to provide the third wireless service to the first CPE node and any other CPE nodes that are located within a fourth distance from the second gateway device. As noted above, one or more external storage mediums (at the BSN) can be coupled to the storage device and the storage device operates as a first storage controller to the one or more external storage mediums. Similarly, one or more additional external storage mediums are coupled to the optional storage device at the RLN and the second storage device operates as a second storage controller to the one or more external storage mediums.

In one embodiment, the radios of the wireless network 100 can utilize wireless protocols, such as IEEE 802.11n, IEEE 802.11ac, or the like, such as outlined in Table 1.

The wireless network 100 can also include additional pico-cell units (not illustrated in FIG. 1) at the same or different dwelling units. For example, downstream node 116 can provide service to downstream nodes (e.g., 128) individually and the downstream nodes can provide service or access to downstream client devices. The wireless network 100 includes a first nano-cell unit 104 that may include multiple dwellings served by first node 110 via downstream node 112. First node 110 can also provide service to additional nano-cell units, such as using downstream node 114. It should be noted that downstream node 112 and downstream node 116 are part of the same network hardware device. That is, the network hardware device establishing is a downstream client (e.g., station) of the first node 110 using a first-tier link, and the network hardware device provides an AP for downstream clients (e.g., 118, 128, etc.).

During or after deployment of the various nodes in wireless network 100, multi-tier channel prioritization system 106 can assign available channels according to a node and channel prioritization scheme as set forth below. It should be noted that the available channels can be within a single radio technology, across multiple radio technologies, and can across a single frequency spectrum, or multiple frequency spectrums. The multi-tier channel prioritization system 106 can include three software components, including node prioritizer 130, channel prioritizer 132, and topology scheduler 134 as described in more detail below.

In one embodiment, node prioritizer 130 groups nodes into three Link Tiers: Link-1, Link-2, and Link-3 tiers. Link-1 tier includes nodes that have direct internet backhaul access and provide service (e.g., internet service) to Link-2 nano-cell units. Link-2 tier includes nodes that have direct access to a Link-1 client node and provide service (e.g.,

TABLE 1

| Item | 802.11n | | 802.11ac | |
| --- | --- | --- | --- | --- |
| | IEEE | Proposed Network | IEEE | Proposed Network |
| Release | October 2009 | | January 2014 | |
| Application | Household device connectivity (e.g., VOD service, phone, tablets) | | Infrastructure connectivity (N1 mesh, N2 star) | |
| Channel | 20/40 MHz | 20 MHz | 20/40/80/160 MHz | 20/40 MHz |
| Max Phy Rate | 600 Mbps | 140 Mbps | 1 Gbps | 400 Mbps |
| Max TCP Rate | ~400 Mbps | 1000 Mbps | ~800 Mbps | 300 Mbps |
| MIMO Type | Single user | | Single user, Multi-user | |
| MIMO Stream | 4 × 4 | 2 × 2 | 8 × 8 | 2 × 2 |
| MAC Mechanism | Frame aggregation (A-MSDU and A-MPDU), Block Ack, Reverse direction (RD) | | Enhanced Frame Aggregation (large sizes) | |
| PHY Layer (modulation) | BPSK/QSK/16QAM/64QAM | | BPSK/QSK/16QAM/64QAM/256QAM | |
| Frequency Band | 2.4/5.x | 2.4 | 5.x | 5.x |
| Type | High Throughput | | Very High Throughput | |
| Number of Channels | | 3 × 20 MHz | | 5 × 40 MHz (non-DFS) + 8 × 40 MHz (DFS) |
| Protocol | | | CSMA-CA | |

Figure 2:
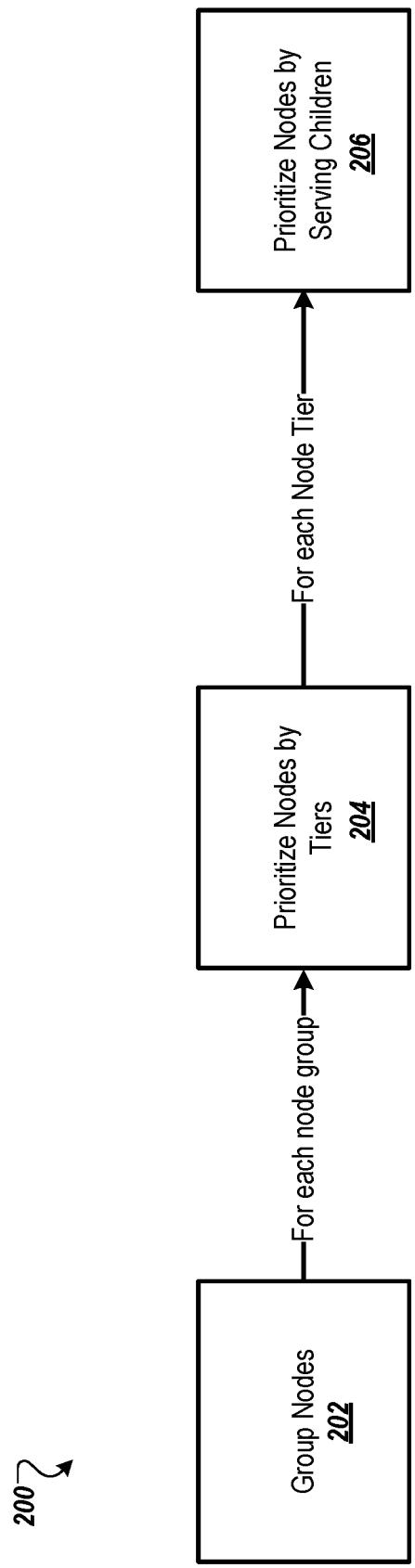
FIG. 2 is a flow diagram of a node prioritization process according to one embodiment.

As described herein, the wireless network 100 is scalable according to the defined cell units, nodes, and device roles. As illustrated in FIG. 1, the wireless network 100 includes a first pico-cell unit 102 that may include a first dwelling unit served by downstream node 118 (e.g., a gateway device).

internet service) to Link-3 pico-cell units. Link-3 tier includes nodes that provide service (e.g., internet service) to customer premises. Within each Link Tier, the nodes are sorted based on the number of children nodes served by the node. In one embodiment, node prioritizer 130 outputs is a list of nodes prioritized by Tiers and then prioritized by the number of children nodes being served. A deployment operator or a cloud controller can operate the node prioritizer 130 to perform the node prioritization process, such as illustrated in FIG. 2. In at least one embodiment, the hierarchy is as follows: nodes can be organized into a group of nodes based on geographical location, and the group can be further organized, such as in one or more subsets of nodes that are organized as one or more micro-cell units. Within each of the one or more micro-cells units, the nodes can be further organized as one or more nano-cell units. Within each of the one or more nano-cell units, the nodes can be further organized as one or more pico-cell units. As such, a first group of nodes can include a first subset of nodes (at a micro level), a second subset of nodes (at a nano level) within the first set of nodes, and a third subset of nodes (at a pico level) within the second subset of nodes.

FIG. 2 is a flow diagram of a node prioritization process 200 according to one embodiment. The node prioritization process 200 may be performed by processing logic that comprises hardware (e.g., circuitry, dedicated logic, programmable logic, microcode, etc.), software, firmware, or a combination thereof. In one embodiment, the node prioritization process 200 may be performed by node prioritizer 130 of FIG. 1.

Referring to FIG. 2, the node prioritization process 200 begins by grouping nodes (block 202). In at least one embodiment, to optimize the node prioritization process 200, nodes can first be grouped based on their geographical location and proximity to other groups. For example, node prioritizer 130 can receive scan lists from the node, where each scan list identifies neighboring devices and respective signal strength indicators (e.g., receive signal strength indicator (RSSI) values). In another embodiment, node prioritizer 130 can receive global positioning system (GPS) coordinates from one or more of the nodes for grouping the nodes based on geographic location. Groups that have no overlapping radio frequency signals can be grouped into separate groups and processed in parallel by node prioritizer 130, such as illustrated in FIG. 3.

Figure 3:
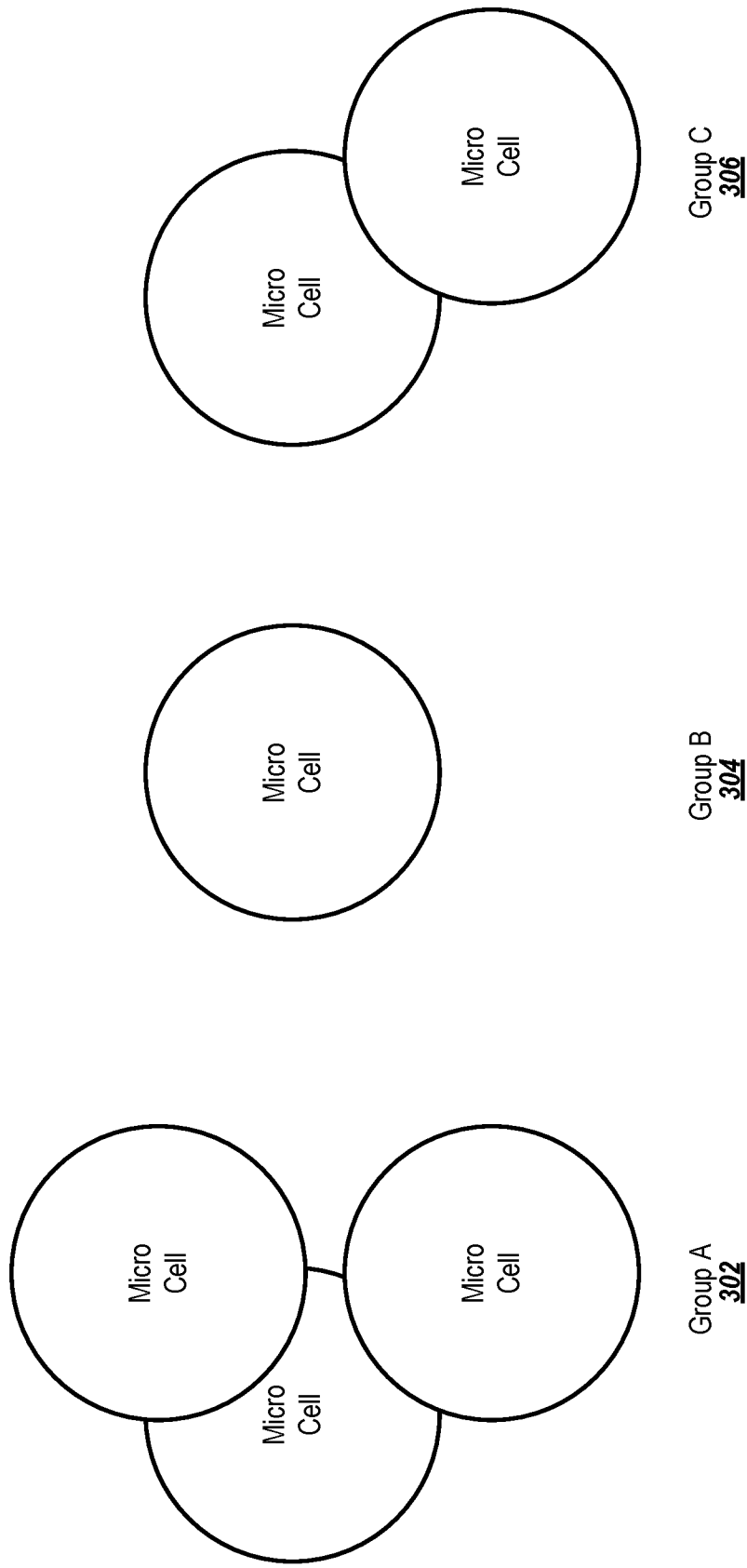
FIG. 3 illustrates three separate groups that are organized based on physical proximity according to one embodiment.

FIG. 3 illustrates three separate groups that are organized based on physical proximity according to one embodiment. As described above, node prioritizer 130 groups nodes geographically and by proximity using location information (e.g., GPS coordinates, scan lists with RSSI values, or the like). Nodes that can detect energy from neighboring nodes can be placed in the same group and each group can include one or more nodes or clusters that are in proximity and can detect energy from neighboring nodes or clusters. In at least one embodiment, node prioritizer 130 groups nodes into a first group 302 (Group A), a second group 304 (Group B), and a third group 306 (Group C). Second group 304 includes a single micro-cell unit, whereas first group 302 and third group node 306 include multiple micro-cell units. In at least one embodiment, node prioritizer 130 groups a first set of node identifiers using physical proximity information associated with wireless devices located in a first area, where each of the first set of node identifiers identifies a wireless device that is part of a wireless network with a three-tier topology, such as illustrated in FIG. 1.

Referring back to FIG. 2, after grouping nodes at block 202, node prioritization process 200 prioritizes nodes by tiers for each group node (block 204). In at least one embodiment, processing logic determines a tier type of each of the nodes by using information collected from the nodes. For example, the node can have a parameter that is programmed to indicate that the node is a Link-1 Tier, a Link-2 Tier, or a Link-3 Tier. Processing logic can generate, from the first set of node identifiers, a first list (or sub-list) of node identifiers associated with a first-priority tier (Link-1 Tier), a second list (or sub-list) of node identifiers associated with a second-priority tier (Link-2 Tier), and a third list (or sub-list) of node identifiers associated with a third-priority tier (Link-3 Tier). Node prioritization process 200, for each node tier, prioritizes nodes by the number of children nodes being served by the respective node (block 206). The number of children nodes is also referred to as the number of serving children. Node prioritizer 130 can collect this information from each of the nodes in the wireless network.

After prioritizing nodes by tiers and by serving children, node prioritizer 130 outputs a list of nodes prioritized by tiers and then prioritized by the number of children nodes being served within each tier. The prioritized list can be used by the channel prioritizer 132, topology scheduler 134, or both. Concurrently or sequentially, channel prioritizer 132 can process channel assignments according to the prioritized list. That is, within each group, nodes are processed by the channel prioritizer 132 in the order of the tiering priority. A first-priority tier (Link-1 Tier) with nodes of a first-tier type is processed first so that these nodes are assigned the best available channels. In at least one embodiment, the node type is at least one of a first-tier type, a second-tier type, and a third-tier type, where the first-tier type has a higher priority than the second-tier type and the third-tier type, and the second-tier type has a higher priority than the third-tier type. It should be noted that nodes in the first tier (Link-1 Tier) do not consider nodes from a second-priority tier or a third-priority tier as neighboring nodes. Once the first-priority tier is processed, the second-priority tier (Link-2 Tier) with nodes of a second-tier type is processed next so that these nodes are assigned the best channels from the remaining available channels after the first-priority tier is processed. Nodes in the second-priority tier consider nodes in the first-priority tier and the second-priority tier as neighboring nodes but do not consider nodes from the third-priority tier as neighboring nodes. Once the second-priority tier is processed, the third-priority tier (Link-3 Tier) with nodes of a third-tier type is processed next with the remaining available channels. Nodes in the third-priority tier consider nodes in the first-priority tier and the second-priority tier as neighboring nodes. As described above, in at least one embodiment, nodes are processed in the order of the number of serving children nodes within each tier. That is, nodes with the most children nodes are processed before nodes with fewer children nodes within each of the multiple tiers. As such, the node prioritization process does not assume that all nodes in the wireless network are of the same type and priority and the node prioritization process can assign channels in a prioritized manner to ensure optimal QoS to nodes that are higher priority, such as nodes that are serving more client nodes than other nodes. In some embodiments, one or more channels can be reused if it is determined that there are no available channels remaining for channel assignments. Additional rules can be implemented to the cost function to accommodate these scenarios.

As described above, the channel prioritizer 132 can use the prioritized list for a channel prioritization process that selects a best available channel using a cost function. In at least one embodiment, a cost function can use cost function penalties that are based on Co-Channel conditions, Adjacent Channel conditions, Alternate Adjacent Channel conditions, channel congestion, and number of APs. That is, Co-Channel, Adjacent Channel, Alternate Adjacent Channel threshold, channel congestions, and number of APs can be used to determine a penalty cost for each channel in a list of available channels. Co-Channel Threshold, as denoted as Co-Channel Indicator (CCI), defines a maximum interferer's power received by a receiver that would cause desensitization of the receiver's intended signal. Adjacent Channel Threshold, as denoted as Adjacent Channel Indicator (ACI), defines a maximum interferer's power received by a receiver that would cause desensitization of the receiver's intended signal if the interferer is 20 MHz away from the receiver's operating channel. Alternate Adjacent Channel Threshold, as denoted as Alternate Adjacent Channel Indicator (AACI), defines a maximum interferer's power received by a receiver that would cause desensitization of the receiver's intended signal if the interferer is 40 MHz away from the receiver's operating channel. The following Table 1 shows example channel thresholds for CCI, ACI, and AACI.

TABLE 1

Channel Thresholds

| Condition | Frequency(MHz) | Desense (dB) | MAX RSSI (dBm) |
|---|---|---|---|
| CCI | 5190 MHz(Ch36) | 0 | −95 |
|  |  | 1 | −85 |
| ACI | 5230 MHz(Ch44) | 0 | −72 |
|  |  | 1 | −68 |
| AACI | 5270 MHz(Ch52) | 0 | −57 |
|  |  | 1 | −52 |

In at least one embodiment, a cost function can include the following rules: a first rule that excludes any channel occupied by higher-tier links if AACI, ACI, or CCI conditions are not met (e.g., Link-3 will avoid channels used by Link-2 and Link-1); a second rule that excludes channels that do not meet an EIRP requirement; a third rule that adds a congestion penalty to each channel based on a congestion level; a fourth rule that adds a penalty to each channel for each out-of-network AP found on the channel; and a first set of rules based on whether the node is in either Link-1 or Link-2 Tiers or a second set of rules based on the node being in Link-3 Tier. For the first set of rules, a first number (Nc) that represents a number of CPEs served by a neighboring node is determined for use by the first set of rules or the second set of rules.

For the first set of rules for nodes in Link-1 or Link-2 Tiers, a fifth rule adds a first weighted penalty value to adjacent AACI_Isolation channels where the neighboring node's RSSI value is above an AACI threshold. The first weighted penalty value can be the first number (Nc) multiplied by a first weight (e.g., 3×Nc). For the first set of rules, a sixth rule adds a second weighted penalty value to adjacent ACI_Isolation channels where the neighboring node's RSSI value is above an ACI threshold. The second weighted penalty value can be the first number (Nc) multiplied by a second weight (e.g., 4×Nc). For the first set of rules, a seventh rule adds a third weighted penalty value to channels where the neighboring node's RSSI value is above a CCI threshold. The third weighted penalty value can be the first number (Nc) multiplied by a third weight (e.g., 5×Nc). In one embodiment, the first weight can be greater than the second weight, and the second weight can be greater than the third weight.

For the second set of rules for nodes in Link-3 Tier, an eighth rule adds a fourth weighted penalty value to adjacent AACI_Isolation channels where the neighboring node's RSSI is above an AACI threshold. The fourth weighted penalty value can be the first number (Nc) multiplied by a fourth weight (e.g., 5×Nc). For the second set of rules, a ninth rule adds a fifth weighted penalty value to adjacent ACI_Isolation channels where the neighboring node's RSSI is above an ACI threshold. The fifth weighted penalty value can be the first number (Nc) multiplied by a fifth weight (e.g., 4×Nc). For the second set of rules, a tenth rule adds a sixth weighted penalty value to channels where the neighboring node's RSSI is above a CCI threshold. The sixth weighted penalty value can be the first number (Nc) multiplied by a sixth weight (e.g., 3×Nc). In one embodiment, the first weight can be less than the second weight, and the second weight can be less than the third weight.

The following is a cost function that adds penalty values to channels according to the following:

Cost Function
    Exclude any channel occupied by higher-tier links if AACI, ACI, or CCI conditions are not met (i.e. Link 3 will avoid channels used by Link 2 and Link 1)
    Exclude channels that do not meet the EIRP requirement
    For Link 1 and Link 2:
        >+(3×Nc) penalty to adjacent AACI_Isolation channels where the neighboring node's RSSI is above AACI_Thresh
        *Nc=Neighbor Node's Number of CPEs
        +(4×Nc) penalty to adjacent ACI_Isolation channels the neighboring node's RSSI is above ACI_Thresh
        >+(5×Nc) penalty to channels the neighboring node's RSSI is above CCI_Thresh
    Link 3 configuration:
        +(5×Nc) penalty to adjacent AACI_Isolation channels the neighboring node's RSSI is above AACI_Thresh
        *Nc=Neighbor Node's Number of Customer Premise Endpoints
        +(4×Nc) penalty to adjacent ACI_Isolation channels where the neighboring node's RSSI is above ACI_Thresh
        +(3×Nc) penalty to channels the neighboring node's RSSI is above CCI_Thresh
    +congestion penalty to each channel based on congestion level
    +5 penalty to each channel for each out-of-network AP found on the channel As described above, the channel prioritizer 132 can use the prioritized list for a channel prioritization process that selects a best available channel using a cost function. In at least one embodiment, the channel prioritizer 132 generates a channel priority list based on cost function penalties for a requested channel bandwidth. For a 20 MHz operating channel, a Cost Function Penalty can be determined as a sum of penalty values for a single 20 MHz channel. The channel prioritizer 132 can determine that a specified channel bandwidth is greater than a single channel bandwidth and can sum penalty values for two or more channels before selecting the available channel. For a 40 MHz operating channel, the Cost Function Penalty can be determined as a sum of penalty values for two 20 MHz channels (primary and extended). Similarly, the Cost Function Penalty can be determined for other bandwidths by summing penalty values for channels for the specified bandwidth. That is when a specified channel bandwidth is greater than a single channel bandwidth, the penalty values of two channels can be summed, where the single channel bandwidth of the two channels add up to be at least the specified channel bandwidth. The channel prioritizer 132 can select a best channel where the best channel is the channel with a lowest sum of penalty values (e.g., lowest Cost Function Penalty). In at least one embodiment, the channel prioritizer 132 can determine a first channel bandwidth requirement for a first wireless device and can determine that the first channel bandwidth requirement is greater than a channel bandwidth. The channel prioritizer 132 can determine a first sum of a penalty value for the first channel and a penalty value for a second channel and determine a second sum of a penalty value for a third channel and a penalty value of a fourth channel. The channel prioritizer 132 can determine that the first sum is lower than the second penalty value when selecting a channel for a channel bandwidth requirement that is larger than a channel bandwidth of each of the channels.

In at least one embodiment, for channels with the same priority, preference can be given by the channel prioritizer 132 to non-DFS channels over DFS channels. In at least one embodiment, if multiple channels have the same penalty value, preference can be given by the channel prioritizer 132 to one of the multiple channels with a lowest EIRP limit to meet a performance threshold.

In at least one embodiment, the channel prioritizer 132 determines that two or more available channels have a same penalty value that is the lowest penalty value and determines that one of the two available channels is a non-DFS channel. The channel prioritizer 132 selects the first available channel since it is the non-DFS channel. In at least one embodiment, the channel prioritizer 132 determines that two or more available channels have a same penalty value that is the lowest penalty value and determines an EIRP limit value for the two or more available channels. The channel prioritizer 132 selects the first available channel since it has a lowest EIRP limit value.

In at least one embodiment, the channel prioritizer 132 determines that the first available channel is a DFS channel and selects selecting a third available channel having a second-lowest penalty value. In at least one embodiment, the channel prioritizer 132 determines that two or more available channels have a same penalty value that is the second-lowest penalty value and determines that one of the two available channels is a non-DFS channel. The channel prioritizer 132 can select the third available channel since it is the non-DFS channel. In at least one embodiment, the channel prioritizer 132 determines that two or more available channels have a same penalty value that is the second-lowest penalty value and determines an EIRP limit value for the two or more available channels. The channel prioritizer 132 selects the third available channel since it has a lowest ETRP limit value.

In at least one embodiment, the channel prioritizer 132 determines that a specified channel bandwidth is greater than a single channel bandwidth. The channel prioritizer 132 sums the penalty value for two or more channels before selecting the first available channel. The channel prioritizer 132 also sums the penalty value for two or more channels before selecting the second available channel.

In at least one embodiment, the node type is at least one of a first-tier type, a second-tier type, and a third-tier type, where the first-tier type has a higher priority than the second-tier type and the third-tier type, and the second-tier type has a higher priority than the third-tier type. The channel prioritizer 132 determines the penalty value using the cost function by: applying a first rule that excludes any channel occupied by a higher tier type responsive to a channel condition not being met; applying a second rule that excludes any channel that does not meet an EIRP threshold; applying a third rule that adds a congestion penalty value to each channel based on a congestion level; applying a fourth rule that adds an additional penalty value to each channel for each out-of-network AP found on the respective channel; applying a fifth rule that adds a first weighted penalty value to alternate adjacent channels where a neighboring node's RSSI value is above an AACI threshold; applying a sixth rule that adds a second weighted penalty value to adjacent channels where the neighboring node's RSSI value is above an ACI threshold, the second weighted penalty value being greater than the first weighted penalty value; and applying a seventh rule that adds a third weighted penalty value to channels where the neighboring node's RSSI value is above a CCI threshold, the third weighted penalty value being greater than the second weighted penalty value. In at least one embodiment, the channel prioritizer 132 generates the first weighted penalty value by multiplying a first weight by a number of children nodes served by the neighboring node; generates the second weighted penalty value by multiplying a second weight by the number of children nodes served by the neighboring node; and generates the first weighted penalty value by multiplying a third weight by the number of children nodes served by the neighboring node. The first weight is greater than the second weight and the second weight is greater than the third weight.

In at least one embodiment, the node type is at least one of a first-tier type, a second-tier type, and a third-tier type, where the first-tier type has a higher priority than the second-tier type and the third-tier type, and the second-tier type has a higher priority than the third-tier type. The channel prioritizer 132 determines the penalty value using the cost function by: applying a first rule that excludes any channel occupied by a higher tier type responsive to a channel condition not being met; applying a second rule that excludes any channel that does not meet an EIRP threshold; applying a third rule that adds a congestion penalty value to each channel based on a congestion level; applying a fourth rule that adds an additional penalty value to each channel for each out-of-network AP found on the respective channel; applying a fifth rule that adds a first weighted penalty value to alternate adjacent channels where a neighboring node's RSSI value is above an AACI threshold; applying a sixth rule that adds a second weighted penalty value to adjacent channels where the neighboring node's RSSI value is above an ACI threshold, the second weighted penalty value being less than the first weighted penalty value; and applying a seventh rule that adds a third weighted penalty value to channels where the neighboring node's RSSI value is above a CCI threshold, the third weighted penalty value being less than the second weighted penalty value. In at least one embodiment, the channel prioritizer 132 generates the first weighted penalty value by multiplying a first weight by a number of children nodes served by the neighboring node; generates the second weighted penalty value by multiplying a second weight by the number of children nodes served by the neighboring node; and generates the first weighted penalty value by multiplying a third weight by the number of children nodes served by the neighboring node. The first weight is less than the second weight and the second weight is less than the third weight.

In at least one embodiment, if the best channel is a DFS channel, the channel prioritizer 132 can select a second-best channel as a backup channel. In at least one embodiment, for channels with the same priority, preference can be given by the channel prioritizer 132 to a non-DFS over a DFS channel. In at least one embodiment, if more than one channel has equal penalty values, preference can be given by the channel prioritizer 132 to the channel with the lowest EIRP limit to meet the performance threshold, such as illustrated in FIG. 4.

Figure 4:
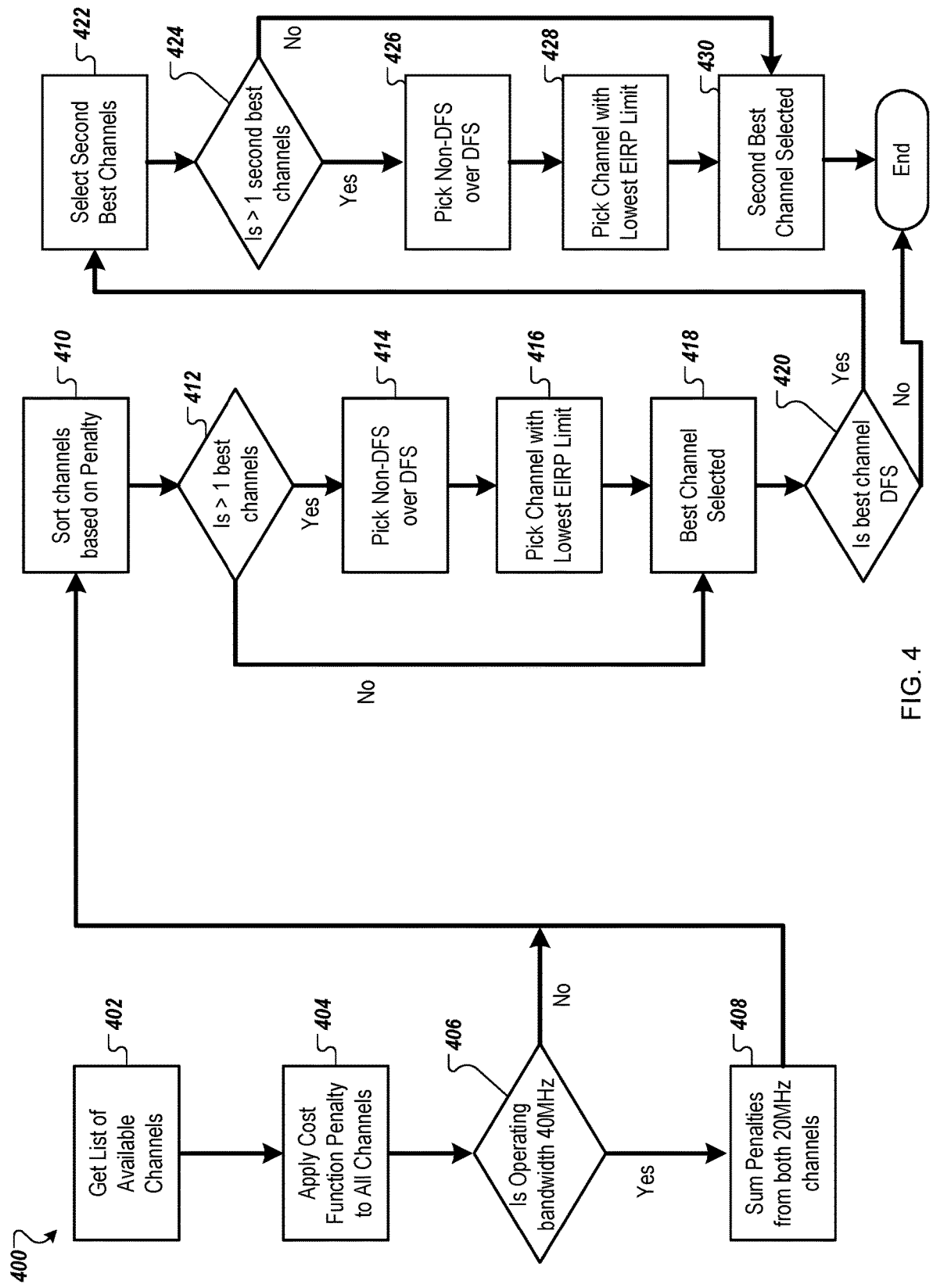
FIG. 4 is a flow diagram of a channel prioritization process 400 according to one embodiment.

FIG. 4 is a flow diagram of a channel prioritization process 400 according to one embodiment. The channel prioritization process 400 may be performed by processing logic that comprises hardware (e.g., circuitry, dedicated logic, programmable logic, microcode, etc.), software, firmware, or a combination thereof. In one embodiment, the channel prioritization process 400 may be performed by channel prioritizer 132 of FIG. 1.

Referring to FIG. 4, the channel prioritization process 400 begins by processing logic obtaining a list of available channels (block 402). Processing logic applies cost function penalty values to all channels according to the cost function as described herein (block 404). Processing logic determines whether an operating bandwidth is 40 MHz (block 406). If the operating bandwidth is 40 MHz, processing logic sums penalty values from both 20 MHz channels (block 408) and sorts the list of available channels based on penalty values to obtain a sorted channel list (block 410). If the operating bandwidth is not 40 MHz at block 406, processing logic skips block 408 and proceeds to sort the list of available channels to obtain the sorted channel list at block 410. If additional bandwidths are used, additional operations can be used to sum penalty values from the channels corresponding to the specific bandwidth before sorting the list of channels based on penalty values. At block 412, processing logic determines whether there is more than one best channel. As described above, a best channel is a channel having a lowest penalty value. In some cases, channels can have the same lowest value. In this case, the processing logic selects a non-DFS channel over a DFS channel (block 414). If both channels are the same type, processing logic selects a channel with a lowest EIRP limit (block 416). At block 418, processing logic identifies the one channel as the best channel selected. If there is only one best channel identified at block 412, the processing logic identifies this channel as the best channel selected at block 418, skipping operations at block 414 and block 416.

As noted above, in some cases, the list of available channels can include DFS channels. As such, processing logic determines whether the best channel selected at block 418 is a DFS channel (block 420). If the best channel selected at block 420 is not DFS, the processing logic ends with the best channel selected from block 418. However, if the best channel selected at block 420 is DFS, the processing logic selects a second-best channel. A second-best channel is a channel having a second-lowest penalty value. At block 424, processing logic determines whether there are more than one second best channels. In some cases, channels can have the same second lowest value. In this case, the processing logic selects a non-DFS channel over a DFS channel (block 426). If both channels are the same type, processing logic selects a channel with a lowest EIRP limit (block 428). At block 430, processing logic identifies the one channel as the second-best channel selected, and the channel prioritization process 400 ends with the second-best channel being selected from block 430. If there is only one second best channel identified at block 424, the processing logic identifies this channel as the second-best channel selected at block 430, skipping operations at block 426 and block 428.

Figure 5:
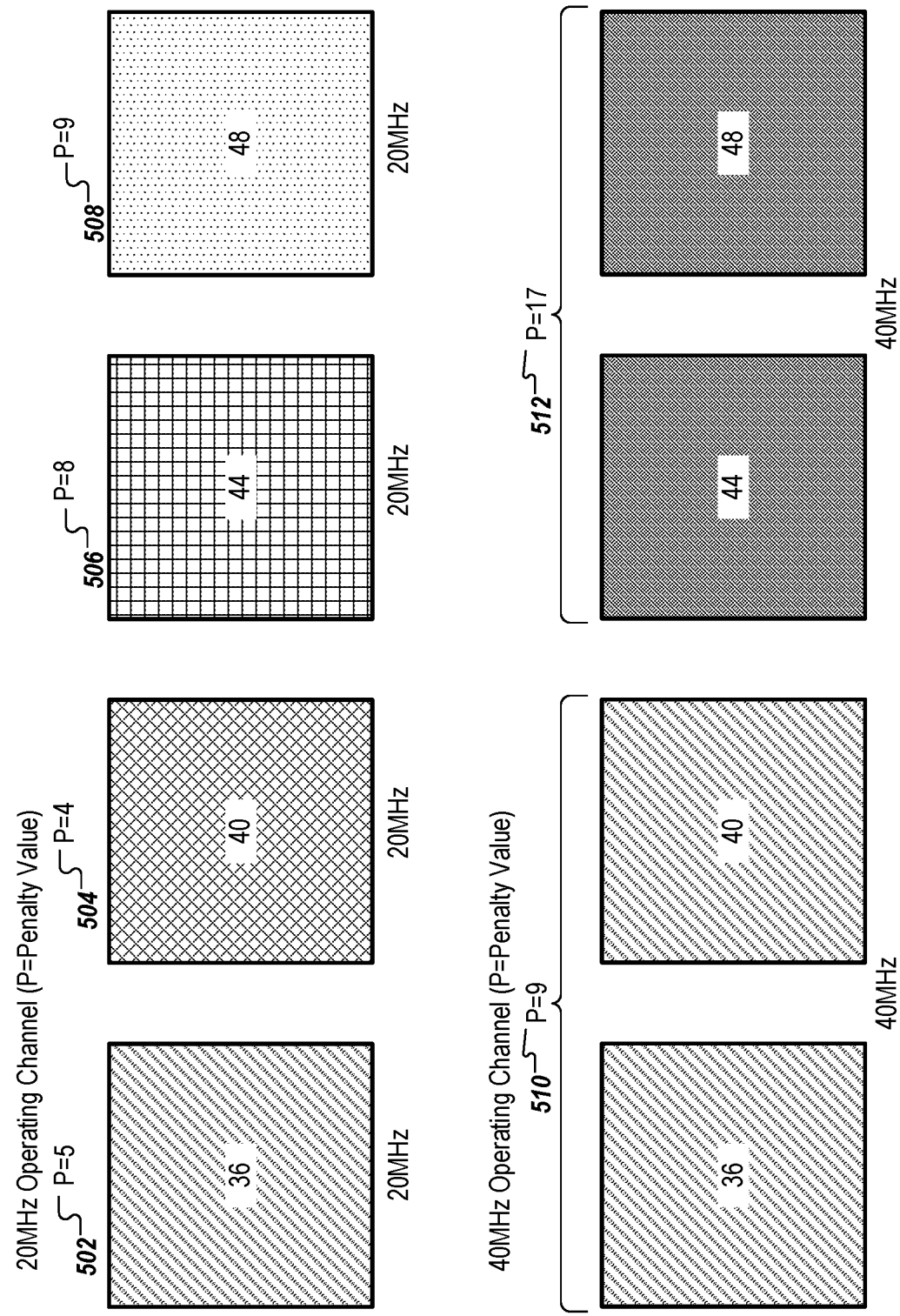
FIG. 5 illustrates penalty values assigned to four different channels by the cost function according to one embodiment.

As described above, if the operating bandwidth is 40 MHz, processing logic sums penalty values from both 20 MHz channels, such as illustrated in FIG. 5.

FIG. 5 illustrates penalty values assigned to four different channels by the cost function according to one embodiment. In this example, channels 36, 40, 44, and 48 are used. When the operating channel bandwidth is 20 MHz, a first penalty value 502 (e.g., 5) is determined for channel 36, a second penalty value 504 (e.g., 4) is determined for channel 40, a third penalty value 506 (e.g., 8) is determined for channel 44, and a fourth penalty value 508 (e.g., 9) is determined for channel 48. In this case, channel 40 would be selected as the best channel since the second penalty value 504 is the lowest among the other channels. When the operating channel bandwidth is 40 MHz, a fifth penalty value 510 is determined for channels 36 and 40 and a sixth penalty value 512 is determined for channels 44 and 48. In at least one embodiment, the fifth penalty value 510 is a sum of the first penalty value 502 determined for channel 36 and the second penalty value 504 determined for channel 40. Similarly, the sixth penalty value 512 is a sum of the third penalty value 506 determined for channel 44, and the fourth penalty value 508 determined for channel 48. In this case, channels 36 and 40 would be selected as the best channels since the fifth penalty value 510 is lower than the sixth penalty value 512.

Figure 6:
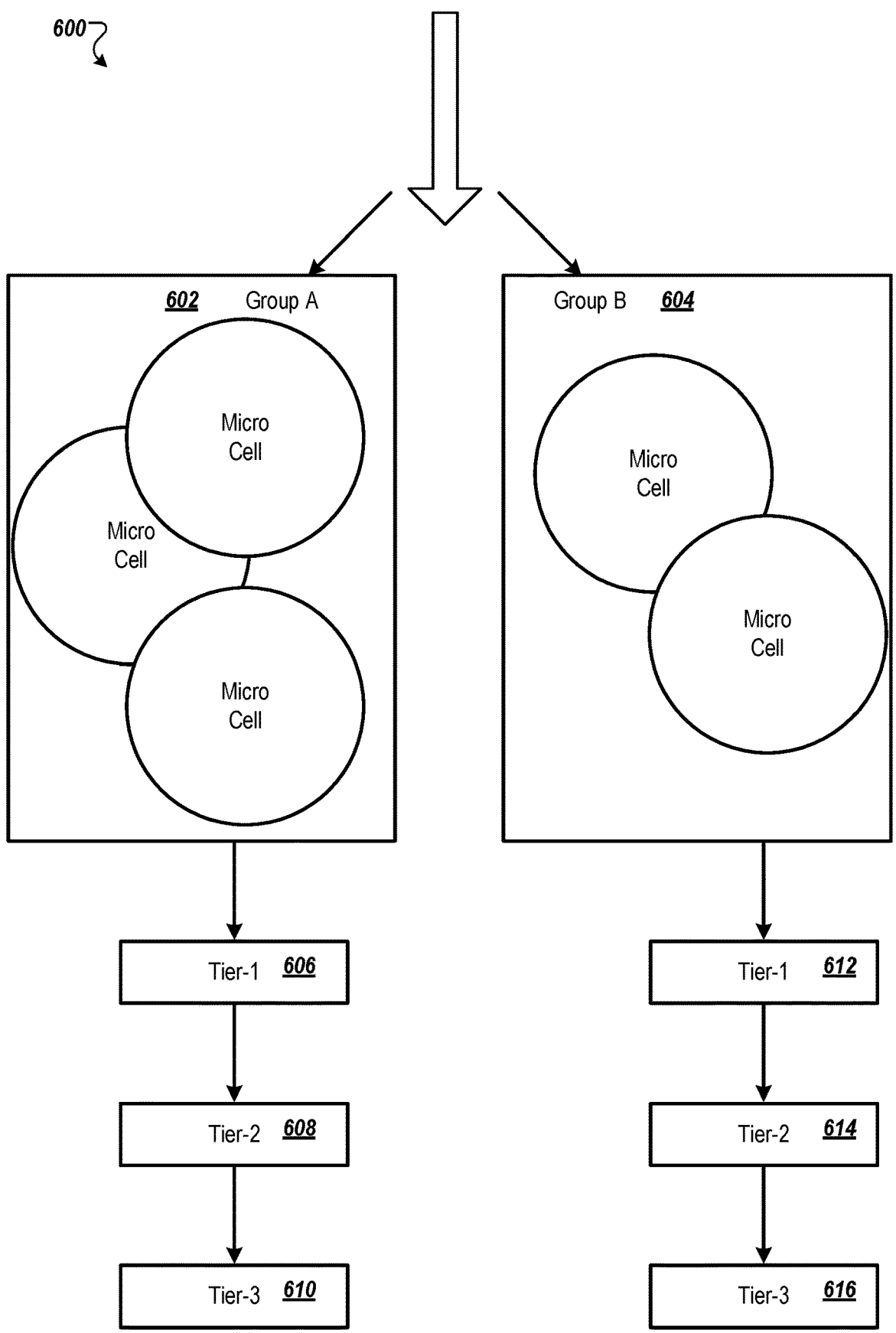
FIG. 6 is a diagram illustrating a process flow in which nodes are grouped into two groups for parallel processing of node and channel prioritization according to multiple tiers according to one embodiment.

As described herein, groups that have no overlapping radio frequency signals can be grouped into separate groups and processed in parallel, such as illustrated in FIG. 6.

FIG. 6 is a diagram illustrating a process flow 600 in which nodes are grouped into two groups for parallel processing of node and channel prioritization according to multiple tiers according to one embodiment. Process flow 600 may be performed by processing logic that comprises hardware (e.g., circuitry, dedicated logic, programmable logic, microcode, etc.), software, firmware, or a combination thereof. In one embodiment, the node prioritization process 200 may be performed by the multi-tier channel prioritization system 106 of FIG. 1.

Referring to FIG. 6, the process flow 600 begins by grouping a first set of node identifiers using physical proximity information associated with a first set of wireless devices in three micro-cells units located in a first area (block 602) and grouping a second set of node identifiers using physical proximity information associated with a second set of wireless devices in two micro-cell units located in a second area (block 604). Each of the first set of node identifiers is part of a first group and identifies a wireless device that is part of a wireless network with a three-tier topology. Each of the second set of node identifiers is part of a second group and identifies a wireless device that is part of the wireless network. In other embodiments, each micro-cell unit can be considered a separate wireless network or each group can be considered a separate wireless network.

After grouping the nodes into groups, each group can be processed in parallel. For the first group, the process flow 600 can generate, from the first set of node identifiers, a first list of node identifiers associated with a first-tier type, and the first list is prioritized according to a number of children nodes connected to the respective device (block 606). The first list can be organized in an order in which channels are assigned to devices in the first list, for example, in descending order of the number of children nodes for devices within the first-priority tier. At block 606, the process flow 600 can assign, from a list of available channels, an available channel to each node identifier in the first list using a cost function that applies a set of penalties for a specific channel bandwidth as described above. Once channels have been assigned to devices in the first list, the process flow 600 can generate, from the first set of node identifiers, a second list of node identifiers associated with a second-tier type, and the second list is prioritized according to a number of children nodes connected to the respective device (block 608). The second list can be organized in an order in which channels are assigned to devices in the second list, for example, in descending order of the number of children nodes for devices within the second-priority tier. At block 608, the process flow 600 can assign, from the list of available channels after channel assignments are given to the first list, an available channel to each node identifier in the second list using the cost function. Once channels have been assigned to devices in the second list, the process flow 600 can generate, from the first set of node identifiers, a third list of node identifiers associated with a third-tier type, and the third list is prioritized according to a number of children nodes connected to the respective device (block 610). The third list can be organized in an order in which channels are assigned to devices in the third list, for example, in descending order of the number of children nodes for devices within the third-priority tier. At block 610, the process flow 600 can assign, from the list of available channels after channel assignments are given to the first list and the second list, an available channel to each node identifier in the third list using the cost function.

Similarly, for the second group, the process flow 600 can generate, from the second set of node identifiers, a fourth list of node identifiers associated with a first-tier type, and the fourth list is prioritized according to a number of children nodes connected to the respective device (block 606). The fourth list can be organized in an order in which channels are assigned to devices in the fourth list, for example, in descending order of the number of children nodes for devices within the first-priority tier. At block 606, the process flow 600 can assign, from a list of available channels, an available channel to each node identifier in the fourth list using a cost function that applies a set of penalties for a specific channel bandwidth as described above. Once channels have been assigned to devices in the fourth list, the process flow 600 can generate, from the second set of node identifiers, a fifth list of node identifiers associated with a second-tier type, and the fifth list is prioritized according to a number of children nodes connected to the respective device (block 608). The fifth list can be organized in an order in which channels are assigned to devices in the fifth list, for example, in descending order of the number of children nodes for devices within the second-priority tier. At block 608, the process flow 600 can assign, from the list of available channels after channel assignments are given to the fourth list, an available channel to each node identifier in the fifth list using the cost function. Once channels have been assigned to devices in the fifth list, the process flow 600 can generate, from the second set of node identifiers, a sixth list of node identifiers associated with a third-tier type, and the sixth list is prioritized according to a number of children nodes connected to the respective device (block 610). The sixth list can be organized in an order in which channels are assigned to devices in the sixth list, for example, in descending order of the number of children nodes for devices within the third-priority tier. At block 610, the process flow 600 can assign, from the list of available channels after channel assignments are given to the fourth list and the second list, an available channel to each node identifier in the third list using the cost function.

In at least one embodiment, the operations at blocks 606, 608, and 610 and the operations at blocks 612, 614, and 616 can be performed in parallel. It should be noted that operations from one tier in the first group are not necessarily performed simultaneously with operations from the same tier in the second group since the nodes groups can have different numbers of nodes, as well as different numbers of nodes in the respective tier. As such, in at least one embodiment, at least one operation at blocks 606, 608, and 610 is performed concurrently with at least one operation at blocks 612, 614, and 616.

Referring back to FIG. 1, the topology scheduler 134 propagates the channel changes, which are determined by the channel prioritizer 132, to each group identified by the node prioritizer 130. Within each group, the topology scheduler 134 propagates the channel change in the order of Tier-1, followed by Tier-2, then followed by Tier-3. That is, channel changes are sent to nodes with node identifiers associated with a first-tier type, then channel changes are sent to nodes with node identifiers associated with a second-tier type, and then channel changes are sent to nodes with node identifiers associated with a third-tier type. Within each Tier, the topology scheduler 134 can propagate the channel change in parallel to all nodes with the same Tier.

In another embodiment, the topology scheduler 134 can propagate the channel changes to the corresponding nodes in Tier-1 in connection with the operations at block 606, then propagate the channel changes to the corresponding nodes in Tier-2 in connection with the operations at block 608, and propagate the channel changes to the corresponding nodes in Tier-3 in connection with the operations at block 610. Similarly, the topology scheduler 134 can propagate the channel changes in operations at blocks 612, 614, and 616.

In another embodiment, a process flow begins by processing logic generating a list of channels that are available to be assigned to wireless devices that are part of a wireless network. The processing logic determines a first penalty value for each channel of the list. The processing logic selects, from the list, a first channel to be assigned to a first wireless device that is part of the wireless network, the first channel having a lowest penalty value. The processing logic sends, to the first wireless device, first data that causes the first wireless device to operate on the first channel. The processing logic determines a second penalty value for each channel of the list and selects, from the list, a second channel to be assigned to a second wireless device that is part of the wireless network, the second channel having a lowest penalty value. The processing logic sends, to the second wireless device, second data that causes the second wireless device to operate on the second channel.

In another embodiment, the processing logic determines a first channel bandwidth requirement for the first wireless device and determines that the first channel bandwidth requirement is greater than a channel bandwidth. The processing logic determines a first sum of the first penalty value for the first channel and the first penalty value for a third channel and determines a second sum of the first penalty value for the second channel and the first penalty value for a fourth channel. The first sum can be the lowest penalty value.

In at least one embodiment, the processing logic determines that the first channel and a third channel have a same penalty value that is the lowest penalty value and determines that the first channel is a non-DFS channel and the third channel is a DFS channel. The processing logic selects the non-DFS channel over the DFS channel that both have the lowest penalty value.

In at least one embodiment, the processing logic determines that the first channel and a third channel have a same penalty value that is the lowest penalty value and determines a first EIRP limit value for the first channel and a second EIRP limit value for the third channel. The processing logic selects the first channel as having a lowest EIRP limit value.

In at least one embodiment, the processing logic determines that a third channel has a lower penalty value than the first channel and determines that the third channel is a DFS channel. The processing logic selects the first channel as a non-DFS channel having the lowest penalty value over the DFS channel.

In at least one embodiment, the processing logic, responsive to determining that the third channel is a DFS channel, determines that the first channel and a fourth channel have a same penalty value that is the lowest penalty value and determines that the first channel is a non-DFS channel and the fourth channel is a DFS channel. The processing logic selects the non-DFS channel over the DFS channel that both have the lowest penalty value.

Figure 7:
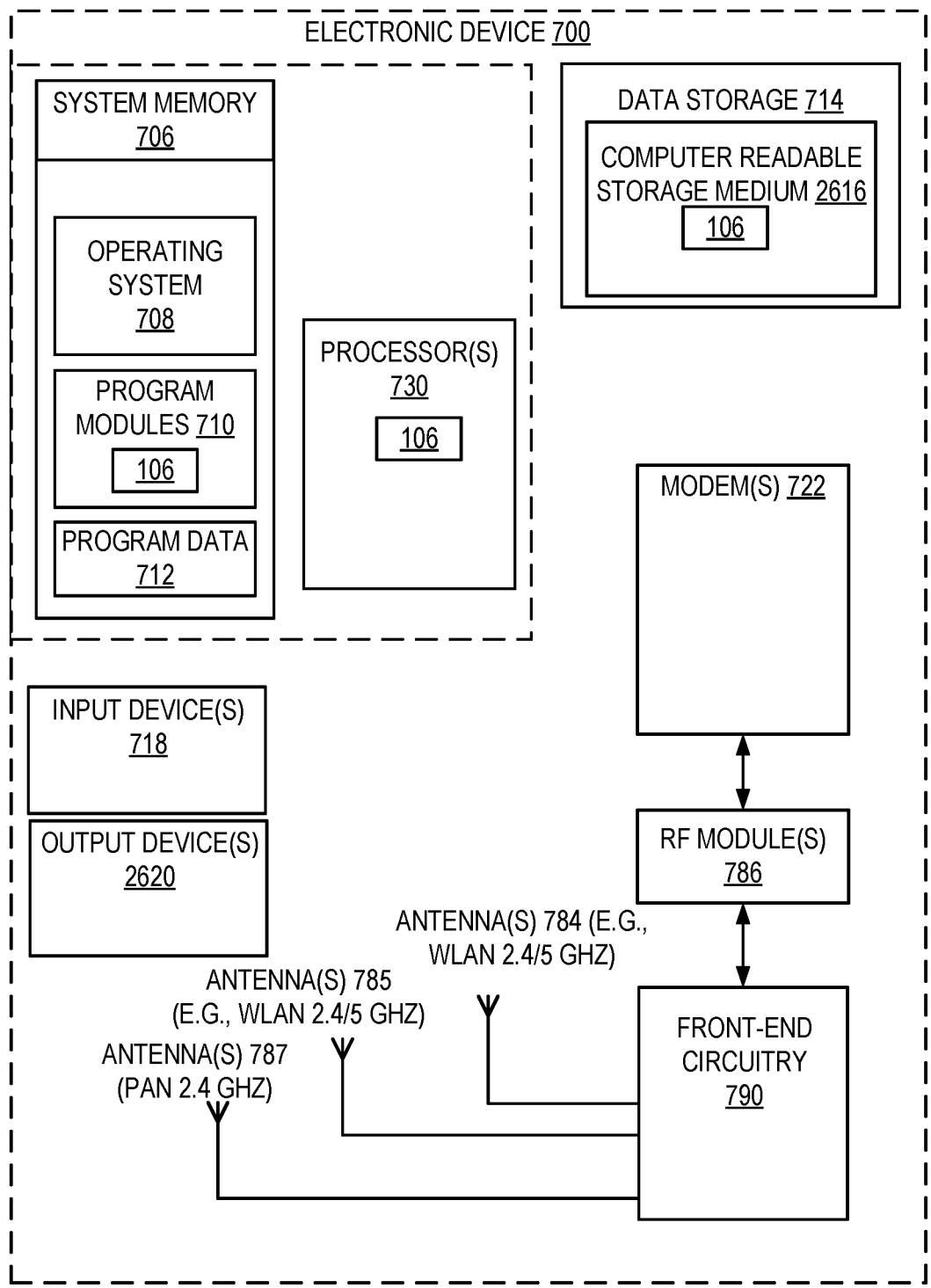
FIG. 7 is a block diagram of a network hardware device 700 with a multi-tier channel prioritization system according to one embodiment.

FIG. 7 is a block diagram of a network hardware device 700 with a multi-tier channel prioritization system 106 according to one embodiment. The network hardware device 700 may correspond to any of the nodes or devices described above with respect to FIGS. 1-6. Alternatively, the network hardware device 700 may be other electronic devices, as described herein.

The network hardware device 700 includes one or more processor(s) 730, such as one or more CPUs, microcontrollers, field-programmable gate arrays, or other types of processing devices. The network hardware device 700 also includes system memory 706, which may correspond to any combination of volatile and/or non-volatile storage mechanisms (e.g., one or more memory devices). The system memory 706 stores information that provides operating system component 708, various program modules 710, program data 712, and/or other components. In one embodiment, the system memory 706 stores instructions of methods to control the operation of the network hardware device 700. The network hardware device 700 performs functions by using the processor(s) 730 to execute instructions provided by the system memory 706. In one embodiment, the program modules 710 may include the multi-tier channel prioritization system 106 described herein (e.g., the node prioritization process 200 of FIG. 2, the channel prioritization process 400 of FIG. 4, the process flow 600 of FIG. 6, or the like).

In at least one embodiment, a processing device is operatively coupled to a memory device that stores instructions. The processing device executes instructions to perform various operations, including: storing first data associated with wireless devices that are part of a wireless network having a three-tier topology, the first data comprising a plurality of node identifiers that each identify a wireless device in the wireless network, a tier type associated with each of the plurality of node identifiers, a number of children nodes connected to the respective device associated with each of the plurality of node identifiers, and physical proximity information associated with each the plurality of node identifiers; grouping a first set of node identifiers using the physical proximity information associated with wireless devices located in a first area; generating, from the first set of node identifiers, a first list of node identifiers associated with a first-tier type, wherein the first list is prioritized according to the number of children nodes; generating, from the first set of node identifiers, a second list of node identifiers associated with a second-tier type, wherein the second list is prioritized according to the number of children nodes; generating, from the first set of node identifiers, a third list of node identifiers associated with a third-tier type, wherein the third list is prioritized according to the number of children nodes; assigning, from a list of available channels, an available channel to each node identifier in the first list using a cost function that applies a set of penalties for a specific channel bandwidth; assigning, from the list of available channels, an available channel to each node identifier in the second list using the cost function after assigning the available channel to each node identifier in the first list; assigning, from the list of available channels, an available to each node identifier in the third list using the cost function after assigning the available channel to each node identifier in the second list; and sending, to the wireless devices located in the first area, second data that identifies assigned channels. In a further embodiment, the operations further include: sending, to the wireless device corresponding to the node identifiers in the first list, a first portion of the second data that identifies the assigned channels; sending, to the wireless device corresponding to the node identifiers in the second list, a second portion of the second data that identifies the assigned channels after sending the first portion; and sending, to the wireless device corresponding to the node identifiers in the third list, a third portion of the second data that identifies the assigned channels after sending the second portion.

The network hardware device 700 also includes a data storage device 714 that may be composed of one or more types of removable storage and/or one or more types of non-removable storage. The data storage device 714 includes a computer-readable storage medium 716 on which is stored one or more sets of instructions embodying any of the methodologies or functions described herein. Instructions for the program modules 710 (e.g., 106) may reside, completely or at least partially, within the computer-readable storage medium 716, system memory 706, and/or within the processor(s) 730 during execution thereof by the network hardware device 700, the system memory 706 and the processor(s) 730 also constituting computer-readable media. The network hardware device 700 may also include one or more input devices 718 (keyboard, mouse device, specialized selection keys, etc.) and one or more output devices 720 (displays, printers, audio output mechanisms, etc.).

The network hardware device 700 further includes a modem 722 to allow the network hardware device 700 to communicate via wireless connections (e.g., such as provided by the wireless communication system) with other computing devices, such as remote computers, an item providing system, and so forth. The modem 722 can be connected to one or more RF modules 786. The RF modules 786 may be a WLAN module, a WAN module, PAN module, GPS module, or the like. The antenna structures (antenna(s) 784, 785, 787) are coupled to the RF circuitry 783, which is coupled to the modem 722. The RF circuitry 783 may include radio front-end circuitry, antenna-switching circuitry, impedance matching circuitry, or the like. The antennas 784 may be GPS antennas, NFC antennas, other WAN antennas, WLAN or PAN antennas, or the like. The modem 722 allows the network hardware device 700 to handle both voice and non-voice communications (such as communications for text messages, multimedia messages, media downloads, web browsing, etc.) with a wireless communication system. The modem 722 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), etc.

The modem 722 may generate signals and send these signals to the antenna(s) 784 of a first type (e.g., WLAN 5 GHz), antenna(s) 785 of a second type (e.g., WLAN 2.4

GHz), and/or antenna(s) 787 of a third type (e.g., WAN), via RF circuitry 783, and RF module(s) 786 as described herein. Antennas 784, 785, 787 may be configured to transmit in different frequency bands and/or using different wireless communication protocols. The antennas 784, 785, 787 may be directional, omnidirectional, or non-directional antennas. In addition to sending data, antennas 784, 785, 787 may also receive data, which is sent to appropriate RF modules connected to the antennas. One of the antennas 784, 785, 787 may be any combination of the antenna structures described herein.

In one embodiment, the network hardware device 700 establishes a first connection using a first wireless communication protocol, and a second connection using a different wireless communication protocol. The first wireless connection and second wireless connection may be active concurrently, for example, if a network hardware device is receiving a media item from another network hardware device via the first connection and transferring a file to another user device via the second connection at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of a wireless mesh network (WMN) and the second wireless connection may be associated with serving a content file to a client consumption device, as described herein.

Though a modem 722 is shown to control transmission and reception via the antenna (784, 785, 787), the network hardware device 700 may alternatively include multiple modems, each of which is configured to transmit/receive data via a different antenna and/or wireless transmission protocol.

In other embodiment, one or more hardware network devices can be mesh network devices in a WMN. A WMN can contain multiple mesh network devices, organized in a mesh topology. The mesh network devices in the WMN cooperate in the distribution of content files to client consumption devices in an environment, such as in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to the MNCS device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multimedia content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of the POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies and may leverage architectural solutions, such as CDN services like the Amazon AWS CloudFront service. Amazon CloudFront CDN is a global CDN service that integrates with other Amazon Web services products to distribute content to end-users with low latency and high data transfer speeds. The embodiments described herein can be an extension to this global CDN, but in environments where there is limited broadband Internet infrastructure. The embodiments described herein may provide users in these environments with a content delivery experience that is equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:

identifying a first group of wireless devices using physical proximity information among the first group of wireless devices, wherein the first group of wireless devices is located in a first geographical area;

for a first wireless device having a highest priority among the first group of wireless devices:
  determining a penalty value for each channel of a plurality of available channels; and
  selecting a first channel having a lower penalty value than penalty values of the remaining channels of the plurality of available channels;

for a second wireless device having a second-highest priority among the first group of wireless devices:
  determining a penalty value for each of the remaining channels of the plurality of available channels; and
  selecting a second channel, from among the remaining channels, having a lower penalty value than the penalty values of the remaining channels;

sending to the first wireless device information about the first channel; and sending to the second wireless device information about the second channel, wherein the highest priority of the first wireless device is based on a number of devices serviced by the first wireless device being greater than a number of devices serviced by other wireless devices of the first group of wireless devices.

2. The method of claim 1, further comprising:

determining that two channels, from the plurality of available channels, have a same penalty value that is a lowest penalty value; and determining that one of the two channels is a non-Dynamic Frequency Selection (non-DFS) channel, wherein selecting the first channel further comprises selecting the non-DFS channel.

3. The method of claim 1, further comprising:

determining that two channels, from the plurality of available channels, have a same penalty value that is a lowest penalty value; and determining an Equivalent Isotropically Radiated Power (EIRP) limit value for each of the two channels, wherein selecting the first channel further comprises selecting a channel, from the two channels, that has a lowest EIRP limit value.

4. The method of claim 1, further comprising:

before selecting the first channel, determining that a third channel has a lower penalty value than the first channel and the third channel is a Dynamic Frequency Selection (DFS) channel, wherein selecting the first channel comprises selecting the first channel, from the plurality of available channels, having the lower penalty value than the penalty values of the remaining channels.

5. The method of claim 4, further comprising:
determining that the first channel and a fourth channel have a same penalty value; and
determining that the first channel is a non-DFS channel, wherein selecting the first channel further comprises selecting the non-DFS channel.

6. The method of claim 4, further comprising:
determining that the first channel and a fourth channel have a same penalty value; and
determining an Equivalent Isotropically Radiated Power (EIRP) limit value for the first channel and the fourth channel,
wherein selecting the first channel further comprises selecting the first channel having a lowest EIRP limit value.

7. The method of claim 1, further comprising:
determining that a specified channel bandwidth for the first wireless device is greater than a single channel bandwidth of the plurality of available channels;
summing the penalty value for the first channel and a third channel before selecting the first channel, wherein the single channel bandwidth of the first channel and the single channel bandwidth of the third channel add up to be at least the specified channel bandwidth; and
summing the penalty value for second channel and a fourth channel before selecting the second channel, wherein the single channel bandwidth of the second channel and the single channel bandwidth of the fourth channel add up to be at least the specified channel bandwidth.

8. A method comprising:
determining a plurality of channels that are available to be assigned to wireless devices that are part of a wireless network;
determining a first penalty value for a first channel of the plurality of channels;
determining a second penalty value for a second channel of the plurality of channels, wherein the second penalty value is higher than the first penalty value;
determining that a first channel bandwidth of a first wireless device is greater than a single bandwidth of the plurality of channels;
determining a third penalty value for a third channel of the plurality of channels;
determining a fourth penalty value for a fourth channel of the plurality of channels, wherein a sum of the second penalty value and the fourth penalty value is greater than a sum of the first penalty value and the third penalty value;
causing the first wireless device to operate on the first channel and the third channel, wherein the first wireless device is part of the wireless network; and
causing a second wireless device to operate on the second wireless channel and the fourth channel, wherein the second wireless device is part of the wireless network.

9. The method of claim 8, further comprising:
determining that the first channel and a third channel have a same penalty value; and
determining that the first channel is a non-Dynamic Frequency Selection (non-DFS) channel and the third channel is a DFS channel, wherein selecting the first channel further comprises selecting the non-DFS channel over the DFS channel that both have the same penalty value.

10. The method of claim 8, further comprising:
determining that the first channel and a third channel have a same penalty value; and
determining a first Equivalent Isotropically Radiated Power (EIRP) limit value for the first channel and a second EIRP limit value for the third channel, wherein selecting the first channel comprises further comprises selecting a channel, from the first and third channels, that has a lowest EIRP limit value.

11. The method of claim 8, further comprising:
determining that a third channel has a lower penalty value than the first channel; and
determining that the third channel is a Dynamic Frequency Selection (DFS) channel, wherein selecting the first channel further comprises selecting the non-DFS channel.

12. The method of claim 11, further comprising:
responsive to determining that the third channel is a DFS channel, determining that the first channel and a fourth channel have a same penalty value; and
determining that the first channel is a non-DFS channel and the fourth channel is a DFS channel, wherein selecting the first channel further comprises selecting the non-DFS channel over the DFS channel that both have the same penalty value.

13. The method of claim 11, further comprising:
responsive to determining that the third channel is a DFS channel, determining that the first channel and a fourth channel have a same penalty value; and
determining an Equivalent Isotropically Radiated Power (EIRP) limit value for the first channel and the fourth channel,
wherein selecting the first channel further comprises selecting the first channel having a lowest EIRP limit value.

14. A computing system comprising:
a memory device to store instructions; and
a processing device, operatively coupled to the memory device, executes the instructions to perform operations comprising:
identify a first group of wireless devices using physical proximity information among the first group of wireless devices, wherein the first group of wireless devices is located in a first geographical area;
for a first wireless device having a highest priority among the first group of wireless devices:
determining a penalty value for each channel of a plurality of available channels; and
selecting a first channel having a lower penalty value than penalty values of the remaining channels of the plurality of available channels;
for a second wireless device having a second-highest priority among the first group of wireless devices:
determining a penalty value for each of the remaining channels of the plurality of available channels; and
selecting a second channel, from among the remaining channels, having a lower penalty value than the penalty values of the remaining channels;
sending to the first wireless device information about the first channel; and
sending to the second wireless device information about the second channel, wherein the highest priority of the first wireless device is based on a number of devices serviced by the first wireless device being greater than a number of devices serviced by other wireless devices of the first group of wireless devices.

15. The computing system of claim 14, wherein the operations further comprise:
   determine that two channels, from the plurality of available channels, have a same penalty value that is a lowest penalty value; and
   determine that one of the two channels is a non-Dynamic Frequency Selection (non-DFS) channel,
   wherein the first channel is the non-DFS channel.

16. The computing system of claim 14, wherein the operations further comprise:
   determine that two channels, from the plurality of available channels, have a same penalty value that is a lowest penalty value; and
   determine an Equivalent Isotropically Radiated Power (EIRP) limit value for each of the two channels,
   wherein the first channel is a channel, from the two channels, that has a lowest EIRP limit value.

17. The computing system of claim 14, wherein the operations further comprise:
   determine that a third channel has a lower penalty value than the first channel and the third channel is a Dynamic Frequency Selection (DFS) channel before the first channel is selected,
   wherein the first channel is selected, from the plurality of available channels, having the lower penalty value than the penalty values of the remaining channels.

18. The computing system of claim 17, wherein the operations further comprise:
   determine that the first channel and a fourth channel have a same penalty value; and
   determine that the first channel is a non-DFS channel,
   wherein the first channel is the non-DFS channel.

\* \* \* \* \*